Figure 1:
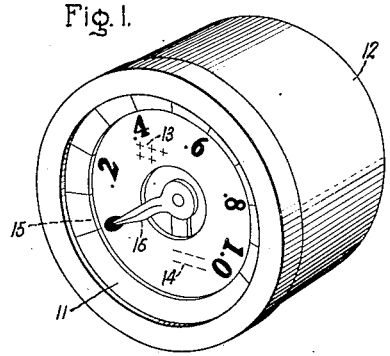

April 11, 1944. J. H. GOSS 2,346,483
CHARGE-PROOF COVER GLASS
Filed Aug. 7, 1942

Inventor:
James H. Goss,
by Harry E. Dunham
His Attorney.

Patented Apr. 11, 1944

2,346,483

UNITED STATES PATENT OFFICE 2,346,483

CHARGEPROOF COVER GLASS

James H. Goss, Swampscott, Mass., assignor to General Electric Company, a corporation of New York Application August 7, 1942, Serial No. 454,063

1 Claim. (Cl. 171—95)

My invention relates to indicating instruments and concerns particularly transparent covers or windows for such instruments.

It is an object of my invention to provide indicating instruments and windows therefor which are not only resistant to shattering and very sturdy, but also free from the characteristic of collecting electrical charges which may interfere with proper deflection of the indicating pointer.

Other and further objects will become apparent as the description proceeds.

It has been common practice for many years to provide electrical instruments and other instruments having deflecting pointers with protective casings, one wall of which is transparent to form a window through which the indicating pointer and the scale with which it cooperates may be observed. Such windows have been composed of glass and are ordinarily referred to as cover glasses. However, glass is relatively fragile and for instruments which are subjected to rough usage or which may be subject to violent vibration, it is desirable to employ a window material which is less fragile but which is nevertheless highly transparent. The optical and mechanical requirements may be satisfied by various synthetic plastics such as cellulose acetate, cellulose nitrate, polymethyl methacrylate and various proprietary materials such as that sold under the trade name "Lucite" which is believed to be polymerized methyl methacrylate.

Such materials have turned out to be unsatisfactory for instrument cover glasses, however, owing to the fact that they accumulate a very high electrical charge in dry weather from such occurrences as a rising current of air, for example. If rubbed for the purpose of cleaning with a piece of cloth, they will acquire excessive electrical charge. The most serious objection to the accumulation of such high charges is the fact that the instrument pointers are attracted by the static charge and are caused to move up scale from the zero position or down scale below zero position or in either direction from some other indicated position as much as one-half or one-third of full scale.

The phenomenon of charge accumulation is not unknown in instruments having ordinary glass windows. However, in the case of glass windows the electrical charge is ordinarily not produced unless the atmosphere is exceedingly dry and then is caused only by violent rubbing with cloth or similar material. Furthermore, such charge is not so strong, is rapidly dissipated, and may often be dissipated immediately by merely breathing on the cover glass. A moderate amount of humidity in the atmosphere prevents such charges from forming on glass. Aside from the strength of the charge, the effect of the charge accumulated on the synthetic plastic is more objectionable also for the reason that in the case of synthetic plastic the charge is not uniform and may be quite different in different parts of the surface of the plastic window, whereas in the case of glass the charge tends to become uniform over the entire surface. I have found that the insulating coefficient and the dielectric constant of transparent synthetic plastics are very much greater than the insulating coefficient and dielectric constant of any type of ordinary glass.

In carrying out my invention in its preferred form, in order to overcome the objectionable charge accumulating characteristic of synthetic plastic windows, I coat the surfaces of the window or the inner surface alone with a thin uniform of conducting material, such as a sputtered film of noble metal, for example, of such a thickness as to reduce the light transmission of the window from 15 to 20 per cent.

A better understanding of the invention will be afforded by the following detailed description considered in connection with the accompanying drawing, and those features of the invention which are believed to be novel and patentable will be pointed out in the claim appended hereto.

Figure 2:
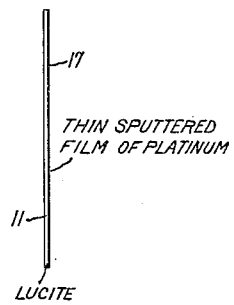
Figure 3:
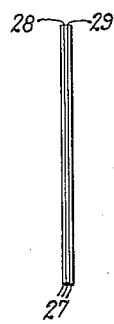
Figure 4:
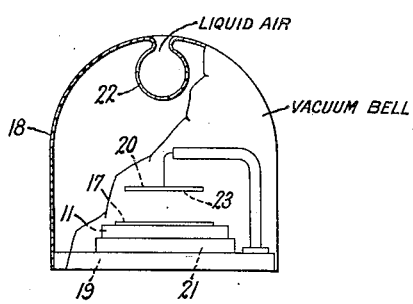

In the drawing Fig. 1 is a perspective view of a long scale deflecting pointer electrical instrument having a charge-proof, shatter-proof scale window in accordance with one embodiment of my invention; Fig. 2 is a cross-sectional view of the window of the instrument illustrated in Fig. 1; Fig. 3 is a cross-sectional view of still another form of charge-proof instrument window which is of laminated type, and Fig. 4 is a schematic diagram illustrating the apparatus for preparing windows of the type illustrated in Figs. 1 and 2. Like reference characters are used throughout the drawing to designate like parts.

In order to construct shatter-proof indicating instruments I preferably select for the transparent cover or window a material which is not only sturdy and relatively free from the danger of breaking or being shattered, but which has suitable optical properties. For example, the material should be light fast, as it should not become opaque or change in its light transmitting characteristics with age. Furthermore, it should be stable with respect to checking, warping and discoloring. Furthermore, it should be relatively hard and unabrasive so as not to be scratched or injured by cleaning. These requirements are met reasonably well by the synthetic plastics mentioned, especially polymethyl methacrylate or the material sold under the name "Lucite."

If a sheet or plate 11 of such material is employed to form the window or transparent cover of an electrical instrument, such as the instrument 12 illustrated in Fig. 1, there will be a tendency for the window 11 to accumulate charges which differ in polarity and intensity at different portions of the surface of the window 11. For example, it may happen that there will be a strong accumulation of positive static electricity at one portion 13 of the inner surface of the window 11, and another accumulation of static electricity of different potential and perhaps even of different polarity at a portion 14 of the window 11. The instrument 12 is shown as having a 240 degree scale 15 with which a deflecting pointer 16 cooperates. Even though the quantity measured by the instrument 12 may be zero, the charge 13 will tend to attract the pointer 16 and deflect it up scale. If the pointer 16 is very light, the charge may even be sufficient to bend pointer 16 in contact with the inner surface of the window 11 so as to charge the pointer 16 or introduce frictional interference with deflection of the pointer 16 in response to variations in quantity measured by the instrument 12.

Furthermore, the action of the electrical charges 13 and 14, or other accumulations of electrical charge, will be very erratic since the pointer 16 may be deflected from its proper position different amounts according to the pointer location, instrument torque, location and strength of the charge and also depending upon relative strengths of various accumulations of charge such as illustrated at the regions 13 and 14 of the instrument window 11.

In order to prevent the formation of charges which have an objectionable action on the instrument pointer 16, I produce an electrically conductive film on at least one surface of the window 11. In case of a solid sheet, such as illustrated in Fig. 2, I may coat one or both surfaces. However, if only one surface is coated, it is preferable to coat the inner surface 17, that is, the surface which is adjacent to the instrument pointer 16. If a suitable conducting film is employed, such as a sputtered film of platinum, for example, it will be sufficient to produce the conducting coating on the inner surface 17 of the window 11 as this conducting coating will act as a shield to protect the pointer 16 against the effect of any charge which may accumulate on the outer surface of the window 11. Static charge cannot accumulate on the inner surface but leaks off to the casing of the instrument 12. Also the film equalizes the charge over the surface.

The conducting film may consists of a thin uniform sputtered film of a noble metal, such as platinum, gold, or the like, and, I believe, even cadmium, may be satisfactorily employed. Although my invention is not limited to the precise arrangements which will be described, I have found that highly satisfactory films may be produced by sputtering platinum on the inner surface of the window 11, and this operation may be carried out by means of apparatus similar to that described in Patent No. 2,189,580, Hewlett. The method to be employed may correspond to that described in connection with the procedure for sputtering platinum described in the Hewlett patent. The sputtering process is preferably carried out for such a length of time and under such conditions as to produce a uniform platinum film of a thickness which gives a reduction of 15 to 20 per cent of the light transmission window. That is to say, the film coated window retains a light transmission which is at least 80 per cent of that of an uncoated sheet of synthetic resin material. The thickness of the film is not critical, but obviously an excessive reduction in light transmission would be undesirable and a film much thinner than suggested would tend to lack sufficient uniformity and conductivity to accomplish the purpose.

For a reason which I am not fully able to explain, I have found that a sputtered film is satisfactory, whereas an evaporated film does not seem to be satisfactory. The reason for this may be that the sputtering process drives the conducting material better into the plastic sheet so as to be better mechanically and to make better contact with electrical charges accumulated by the plastic material, and perhaps the particles of platinum make better electric contact with each other.

Apparatus which may be employed for sputtering the film of platinum on the plate 11 consists of a vacuum bell 18 which may be caused to fit with an air-tight joint over a table 19, with a cathode 20 and an anode 21 mounted within the bell 18. Suitable means are provided for evacuating the bell 18 and for conducting a voltage of suitable potential difference between the electrodes 20 and 21. These features, however, are conventional and are not shown in the drawing.

A sheet 11 of synthetic plastic window material is placed on a suitable support which may be the anode 21 and the vacuum bell 18 is placed over the table 19. The bell 18 is then evacuated until the pressure falls to about one-tenth micron, whereupon inert gas such as argon is introduced at about 230 microns of absolute pressure. Voltage is then applied between the electrodes 20 and 21. If desired, a reentrant bulb 22 may be provided in the vacuum bell 18 for the reception of liquid air which serves to condense any water vapor within the bell 18, and thus dehumidifies the discharge between the electrodes 20 and 21. Advantageously the cathode 20 consists of platinum in mesh form.

Although my invention is not limited to the use of a film sputtered in the precise manner described, I have found that the sputtering conditions required to produce a satisfactory film are rather critical. For example, in using a potential difference between the electrodes 20 and 21 of 500 volts, the most satisfactory films are produced with a spacing of about $\frac{1}{8}$ of an inch between the lowermost surface 23 of the cathode 20 and the top surface 17 of the instrument window 11. In order to protect the sputtered film during handling of the windows a coating of clear lacquer may be applied over the platinum film. A shatter-proof cover glass or window may be produced by the use of laminated transparent material as illustrated in Fig. 3. In this case, by way of example, three sheets 27 are shown joined by a binder at the adjacent surfaces along planes 28 and 29. In this case the electrical potential along the plane 28 or the plane 29 may be made uniform by mixing a conducting material with the binding. For example, an acid or a conducting salt may be used for rendering the binder conductive.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claim.

What I claim as new and desire to secure by Letters Patent of the United States is:

An indicating instrument having a stationary scale and a movable pointer cooperating with the scale, a closed casing containing said instrument, said casing including a window part through which the pointer and scale may be observed, said window being made of shatter-proof transparent plastic material having such insulating and dielectric properties as to accumulate static electric charges of such magnitude and effect as compared to the torque characteristics of the instrument as to deflect the pointer from correct measurement position, and means for dissipating such static electric charges and rendering them harmless on the accuracy indication of the instrument comprising a film of noble metal such as platinum united with the interior surface of said window by a sputtering-on process, the film being sufficiently thin that the light transmission properties of the window are not reduced in excess of twenty per cent.

JAMES H. GOSS.